United States Patent [19]

Gilbert

[11] Patent Number: 5,475,742
[45] Date of Patent: Dec. 12, 1995

[54] SYSTEM FOR REMOTE DATA COLLECTION, PROCESS FOR OPERATING THIS SYSTEM AND ASSOCIATED COLLECTION DEVICE

[75] Inventor: Jérôme Gilbert, Levallois Perret, France

[73] Assignees: Euro CP, Creteil; I.M.S. France - Informations Medicales & Statistiques, Montrouge, both of France

[21] Appl. No.: 42,897

[22] Filed: Apr. 5, 1993

[30] Foreign Application Priority Data

Apr. 3, 1992 [FR] France .................... 92 04104

[51] Int. Cl.$^6$ .................................. H04M 11/00
[52] U.S. Cl. ........................... 379/106; 379/107
[58] Field of Search .................... 379/106, 107, 379/91, 97, 98, 93, 102, 104, 105; 364/408, 401

[56] References Cited

U.S. PATENT DOCUMENTS

| | | |
|---|---|---|
| 4,232,295 | 11/1980 | McConnell . |
| 4,577,063 | 3/1986 | Hanscom et al. . |
| 4,720,851 | 1/1988 | Smith ........................ 379/107 |
| 4,750,201 | 6/1988 | Hodgson et al. ............ 379/91 |
| 4,766,548 | 8/1988 | Cedrone et al. ............ 379/106 |
| 4,833,618 | 5/1989 | Verma et al. .............. 379/107 |
| 4,856,047 | 8/1989 | Saunders ................... 379/106 |
| 4,965,821 | 10/1990 | Bishop et al. ............. 379/91 |
| 4,972,463 | 11/1990 | Danielson et al. ......... 379/106 |
| 4,975,942 | 12/1990 | Zebryk .................... 379/91 |
| 5,223,699 | 6/1993 | Flynn et al. .............. 379/91 |
| 5,311,581 | 5/1994 | Merriam et al. ........... 379/107 |

FOREIGN PATENT DOCUMENTS

| | | |
|---|---|---|
| 0176072 | 4/1986 | European Pat. Off. . |
| WO89/08959 | 9/1989 | WIPO . |

*Primary Examiner*—Curtis Kuntz
*Assistant Examiner*—Stella L. Woo
*Attorney, Agent, or Firm*—Young & Thompson

[57] ABSTRACT

Systems (1) for remote data collection at an assembly of local sites (S1, S2, SN, SL) towards a central site (SC), comprising a central control and processing unit (6, 7), each local site (SC) comprising local data collection devices (D1, D2, DN, 10). In each local site (S1, S2, SN, SL), the local data collection devices (D1, D2, DN, 10) are arranged to identify and collect the data moving in a telecommunication line (L1, L2, LN, 9) and data emitted by external control and processing equipment (P1, P2) and comprise local memories (MR) to store these data. The central site (SC) is arranged to transfer via the telephone network (2) the stored data so as to be processed by the central control and processing unit (6, 7). Use for the collection and processing of data for statistical purpose, particularly in the field of pharmacological distribution.

3 Claims, 3 Drawing Sheets

FIG_1

FIG._2

SYSTEM FOR REMOTE DATA COLLECTION, PROCESS FOR OPERATING THIS SYSTEM AND ASSOCIATED COLLECTION DEVICE

BACKGROUND OF THE INVENTION

1. Field of the Invention

The present invention relates to a system for remote data collection. It also relates to a process for using this system and an associated collection device.

2. Description of the Related Art

The collection of data from various geographic locations, particularly points of sale, effectuated for statistical purposes has considerable and economic importance when it constitutes for example one of the links in the process for calculating profit margins. This collection should be effected under the best conditions of reliability possible, without at the same time requiring too much work, while at the same time providing great flexibility of processing with regard particularly to the nature of the data to be collected and processed.

There is already known from the French patent application No. 2635626 of Aug. 18, 1988, in the name of IMS FRANCE, a collection system for statistical data. This system however has the drawback of rendering difficult rational use of the service center because it is the collection devices which have control of the poll times and drifts of the internal clocks of these devices have already been observed.

Moreover, the problem of the adaptation of the system exists from the time that it is necessary to provide the identification of new protocols for communication.

SUMMARY OF THE INVENTION

The object of the invention is to overcome these drawbacks by providing a telecollection system of data at an assembly of local collection sites to a central site, comprising central control and treatment means, each local site comprising local means to collect data and being connected to a telecommunication network.

According to the invention, in each local site, the local collection means are so arranged as to identify and collect the data passing on a telecommunication line and/or the data emitted from at least one external control and processing equipment and comprising local means to store these data, and the central site comprises means to transfer said stored data so as to be treated by the central control and processing means.

Thus, with the system according to the invention, the locally collected data are not processed locally, but simply stored awaiting transfer toward a central site at which they are then processed, this transfer being controlled at the central site. As a result, it is not necessary to provide the local collection means with complicated means for identifying the protocol, this identification being performed at the central site. This has the result of considerably reducing the cost of the introduction of new protocols of transmission of data.

According to a preferred embodiment of the invention, the data transfer means are normally automatic but could be manually controlled.

According to another aspect of the invention, the process for remote data collection, practiced with the system according to the invention, is characterized in that it comprises a step of identifying and collecting the data passing along a telecommunication line and/or the data emitted by at least one external control and processing equipment, followed by a step of locally storing said data, and a step of transferring said stored data toward the central site, the execution of said transfer step being controlled from the central site, followed by a step of processing said transferred data.

According to still another aspect of the invention, there is provided an device for the collection of data, operated in a system according to the invention, comprising means to identify and collect data passing along a telecommunication line, means to capture said data and means to store said captured data, characterized in that it comprises also means to collect data emitted from at least one external control and processing equipment.

BRIEF DESCRIPTION OF THE DRAWINGS

Other features and advantages of the invention will become apparent from the following description.

In the accompanying drawings given by way of non-limiting example.

DESCRIPTION OF THE PREFERRED EMBODIMENTS

There will now be described a preferred embodiment of the system according to the invention as well as the process for operating it.

Figure 1:
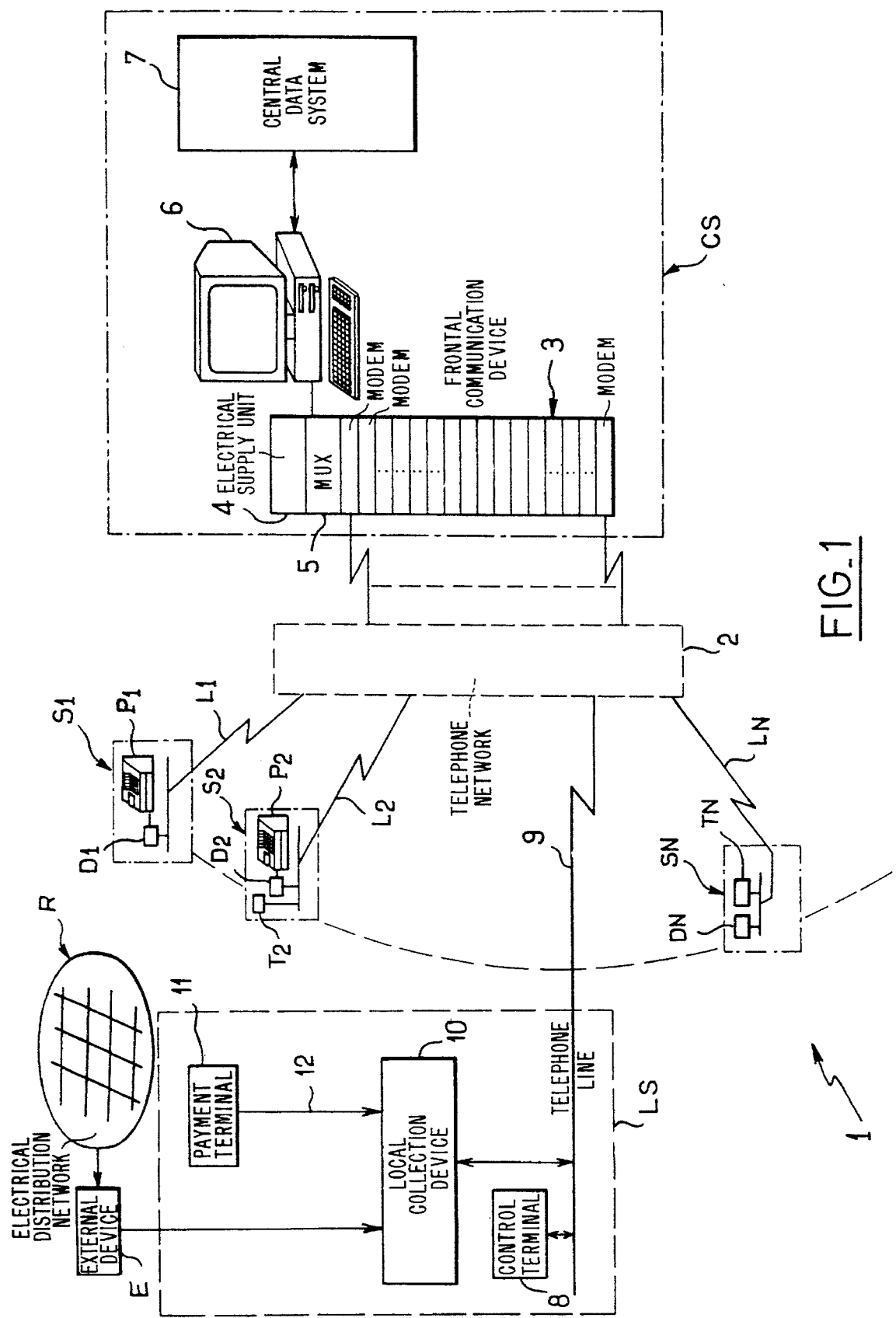
FIG. 1 is a synoptic view of an embodiment of the telecollection system according to the invention.

A telecollection system 1 according to the invention comprises, with reference to FIG. 1, control and processing means 3, 6, 7 in a central site C5 and local telecollection devices D1, D2, DN, 10 in an assembly of local sites S1, S2, SN, SL which can be for example drugstores or other sales points. These local sites S1, S2, SN, LS are connected to the central site SC by an assembly of telephone lines L1, L2, LN, 9 belonging to a telecommunication network, particularly a telephone network 2.

By way of example, a first local site S1 can be provided with a payment terminal P1 connected to the local collection device D1, a second local site S2 can be provided with a second payment terminal P2 connected to the second local collection device D2 and a control terminal T2 connected to the telephone line L2, while another local site SN may be provided with only one control terminal TN connected to the telephone line LN. In the case of use of the system according to the invention for the collection of statistical data relative to the control of the stocking of drugstores, a local site LS is generally provided with a terminal 8 adapted to the control of the instructions to the different distributors and with a payment terminal 11 which can be connected to the local collection device 10 by a connection of the Centronics type generally used for the connection of a printer. Other types of connection can be also envisaged, in parallel or series, for example a connection RS 232 C.

There can also be provided collection device arranged to receive data observed in a second network, for example an electrical distribution network in which flow data by carrier currents, as suggested in FIG. 1 in which the collection device 10 is also connected to an external apparatus E for observation of data passing in a distribution network of electrical energy R. Of course, the second network can rely on the use of other transmission means, for example infrared, radio or filament means.

The local collection device 10 and the control terminal 8 are connected to the telephone line 9 of the local site SL. A central telecollection site SC according to the invention comprises, with reference to FIG. 1, an electrical supply unit 4, a multiplexer 5, in at least one frontal communication device 3 containing an assembly of modulation/demodulation cards (modem), for example 16 in number, each associated with a telecommunication line, and a control and processing unit 6, for example a microcomputer of the PC type, generally connected to a central data system 7. This control and processing unit 6 is provided to permit the following functions:

the control of the relationships between the operator and the system, particularly in the form of presentations in windows and progressing menus, the demultiplexing of the collected data, the processing of these data particularly so as to store them in files of predetermined format, the production of files associated with the telecommunication operations, the control of the functions of use of this telecollection system, particularly:
the configuration of this system,
the telemaintenance of the collection device,
the preparation of poll lists associating with each calling number different operating parameters and data fields necessary for the use of the system.

Figure 2:
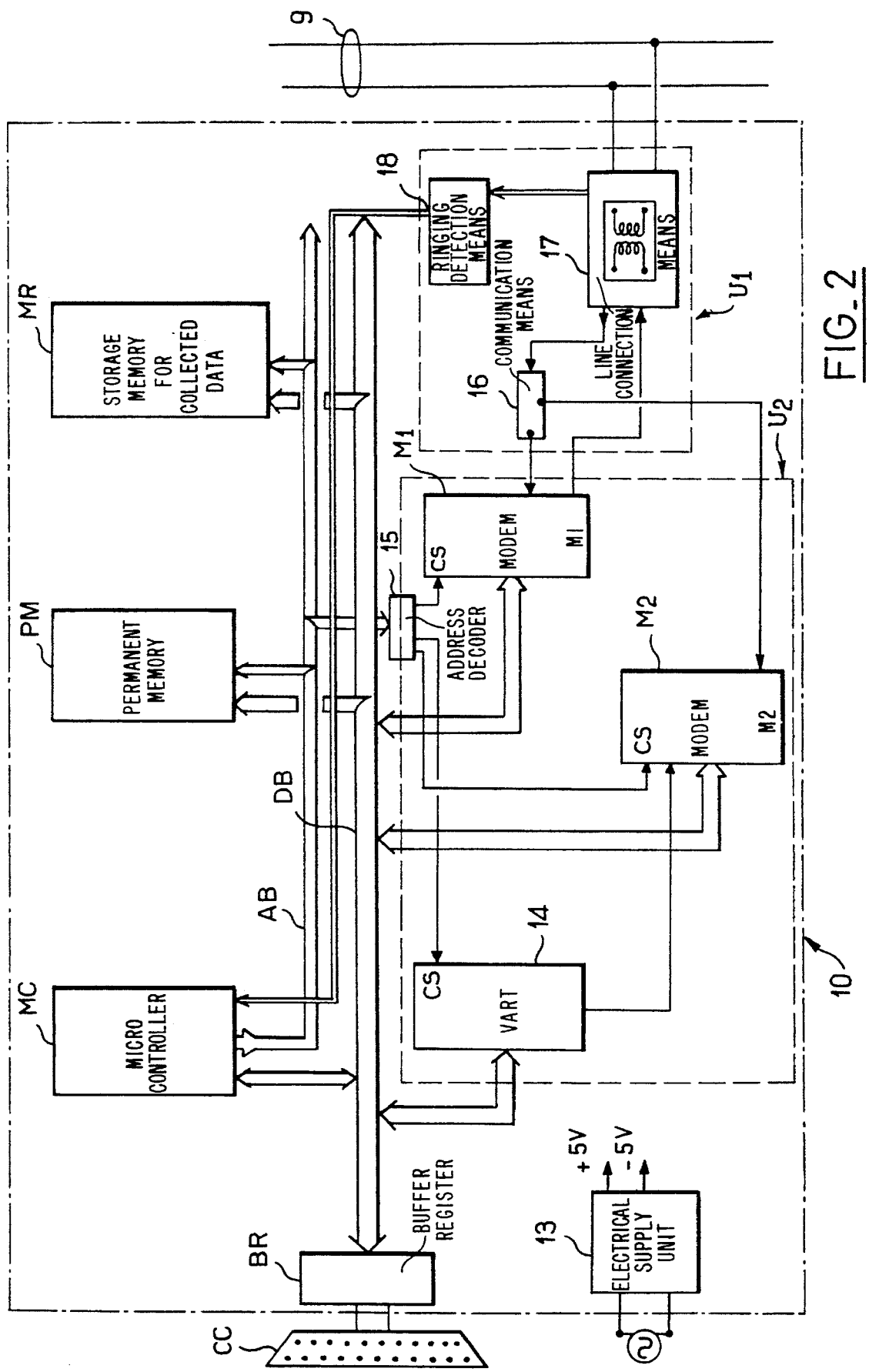
FIG. 2 is a diagram of a particular embodiment of a telecollection device according to the invention.

The telephone lines used by the telecollection system according to the invention can belong to a public and/or private telephone switching network and can use indiscriminately decimal or vocal frequency mode of numbering. Each local collection device 10 comprises, with reference to FIG. 2, a control and processing unit, for example a microcontroller MC, a permanent memory PM, of the PROM, EPROM, Flash EPROM or EEPROM type, containing the program executed by the microcontroller MC, the storage memory of the collected data MR, for example of the protected RAM, EEPROM, Flash EPROM or hard disk type, and communication circuits. The communication circuits comprise a first assembly U1 interfacing with the telephone line 9 comprising detection means for ringing 18 and for line connection 17 and commutation means 16, and a communication assembly U2 containing for example two modulation/demodulation circuits (modem) M1, M2 and a Universal Asynchronous Receive Transmit (UART) 14 associated with these two modulation/demodulation circuits (modem) M1, M2. The above circuits are all connected to a data bus DB to which are of course interfaced the microcontroller MC and the memories PM and MR. An address bus AB controlled at its input by microcontroller MC is connected at least partially to the memory circuits PM, MR and to an address decoder 15 which supplies particularly housing selection signals CS to the different communication circuits. The collection device is also provided with a supply unit 13 ensuring appropriate electrical supply to the different circuits of the device and connector CC permitting external connection to the data bus DB through a buffer register BR.

It is to be noted that the line connection 17 means can preferably comprise only a single standard transformer for coupling a telephone line which can in turn be used in an exchange observation mode on the telephone line by imparting in this case a high impedance to the telephone line so as not to disturb the conditions of use of this line, and as a standard line coupler for the operations of transferring data with the central site by imparting to the line a low impedance according to the standards in force. The polyvalence of this transformer, from a standard point of the primary, is rendered possible by a modification of the load applied to the secondary of said transformer.

In the embodiment of the collection device indicating two modulation/demodulation circuits, a first modem is provided to process a first predetermined communication band, a second modulation/demodulation circuit being dedicated to a second communication band, this configuration permitting to take into account of several communication protocols and to carry out observations on two channels simultaneously. But of course one could provide a collection device comprising but a single modulation/demodulation circuit when it is not necessary to carry out observations on two channels simultaneously.

The local collection device is so arranged as to effect, in the case of a data collection operation on a telecommunication line, a carrier detection at predetermined frequencies, for example 2100 Hz for the observation of transfer according to the notice V21 and/or V23 of the CCITT, and to store the observed data on this line.

It is to be noted that the control software of the collection device can be down-loaded from the central site via the means of the collection system according to the invention.

The use of the telecollection system according to the invention makes use of a database to produce or import files in the ASCII format. One can of course provide conversion programs to permit the processing of data in the case of a database not directly integrating ASCII format data.

The transfer via the switching telephone network of the data previously collected and stored, toward the central processing site, is effected by calling on this latter and according to the known file transfer modes.

No data processing is carried in the collection devices, the totality of the processing being carried out at the telecollection center. In particular, the collected data are not filtered at the collection device.

Figure 3:
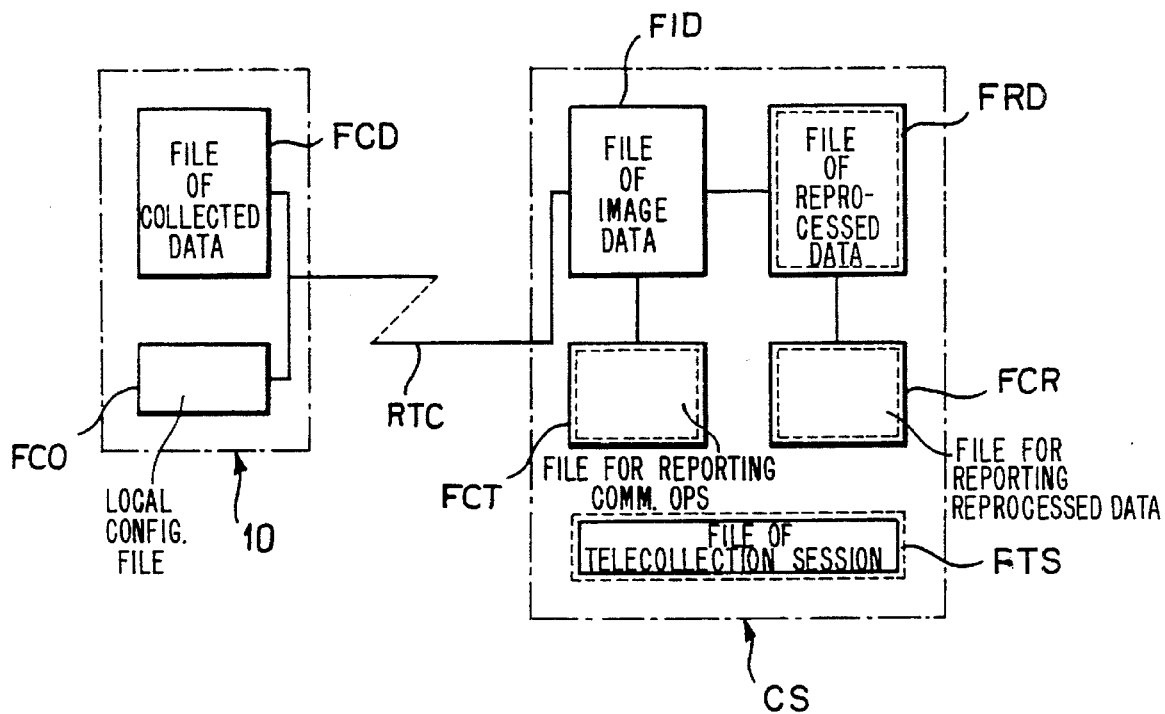
FIG. 3 shows the arrangement of the management of files in the system according to the invention.

Referring to FIG. 3, the telecollection system according to the invention uses an assembly of stored files in the local collection devices and in the central site CS. Each local memory contains a file FCD of the collected data and a file FCO of the configuration of the local collection device 10. At the computer work station 6 of the central site CS, the collection system according to the invention controls a file FID which is the image of the collected data at each local collection device, an assembly of files adapted to the computer system of the operator comprising a reprocessed file FRD of the reprocessed data, a file FCT for reporting the telecommunication operations and a file FCR for reporting the reprocessing of the data, and a file FTS of telecollection session provided by the computer system of the operator.

The operating parameters of the collection device are stored in a non-volatile manner and can be at any moment modified from the central processing site. These parameters, which are processed in the form of one or several status words which can be automatically read or loaded during a transfer, comprise for example:

the number of rings before the line is engaged, an indication of the time (hours, minutes) at which one switches over from long wait to short wait, an indication of the time (hours, minutes) at which one switches over from short wait to long wait, the source of the collected data: single telephone line, parallel entry, or assembly of telephone line-parallel entry.

With the process according to the invention, the specified parameters governing the operation of the collection devices are remotely modifiable from the central site. One can preferably provide a representative field of an operational profile which can for example have a numerical value comprised between 1 and 99. With each value of the operating profile is associated a screen presenting in an explicit manner the functional choices retained among the possible choices. A principal screen arranged as a control panel offers a synthetic view of the poll list. Exploiting it from the central site can thus effect the operations of editing, modifying and safeguarding the parameters associated with an operating profile by selection of the field "Operating profile" associated with each telephone number.

In case of saturation of the storage memory of the collection device, an indication is emitted by the microcontroller on the occasion of the next data transfer, to alert the central site of this saturation.

At the end of each completed telecommunication, the central site emits to the destination of the collection device in question the current date and time. The reception of the date and time of the last executed telecommunication provokes on the one hand its storage in the non-volatile memory of the device as well as the resetting to zero of the day and time counters permitting the time and dating of the events in relative time relative to the moment of the last executed telecommunication, on the other hand the resetting of the time of the clock in real time which in the device permits dating and timing of the events in absolute time. During the production of the data files, the post-processing software installed at the central site effects the necessary corrections so that those days of the month will correspond to the working days of the drugstores.

It can also be provided that, when the function of variation of the number of rings before the line is engaged as a function of the current time is actuated, if the time is not validated, it is the short wait that is selected. This case corresponds to a resetting of the device and of the telecontrolled time from the central site. Similarly, when the function of variation of the number of rings before the line is engaged as a function of the presence or not of the data stored from the last telecollection, the restarting of the microcontroller of the collection device will not disturb this function. When the two preceding functions are selected, the behavior of the collection device relative to the time the line is engaged corresponds to the following table:

| TIME | DAY<br>Short wait | NIGHT<br>Long wait |
| --- | --- | --- |
| Data in memory | | |
| Presence | short wait | long wait |
| Absence | long wait | long wait |

These parameters of the collection device in response to a call have the advantage of contributing to a reduction of the telecommunication costs, because the control and processing means can then be programmed to interpret a long wait at night as the indication by the collection device of the absence of data therein.

Moreover, such parameters permit that the telephone line to which is connected the collection device may be used normally for other purposes (conversation, interrogation of data bases, interrogation of files of credit cards), the telecollection process then not having priority over the other modes of utilization of the telephone line.

Of course, the present invention is not limited to the examples which have been described and numerous arrangements may be given these examples without departing from the scope of the invention.

Thus, there could be provided a one-way version of the system and of the process according to the invention. Moreover, the characteristics of the components constituting the collection device are not limited to those described and can follow the expected progress of this field. Similarly, the system according to the invention can take account of all types of communication protocols without departing from the scope of the invention. There could also be provided collection device according to the invention collecting the data from external observation and capture equipment on any type of network or of support on which the information can move, particularly an electrical energy distribution network or networks using other transmission supports, for example, infrared, radio or fiber. Furthermore, the switched telephone network to which the access nowadays is principally analog could evolve toward digital solutions of the RNIS type without departing from the system according to the invention.

I claim:

1. System for remote data collection comprising a plurality of local collection sites connected to a central site via a communication network, each local collection site comprising local collection means to collect data, local storage means to store said collected data, local communication means to transfer said data to said central site via said communication network, and control terminals connected to said communication network to communicate with remote control centers, said central site comprising central control and processing means and communication means connected to said communication network, wherein said local collection means comprise means for detecting and capturing a data stream exchanged between said control terminals and said remote control centers, said detected and captured data being stored in said local storage means and being transferred at a predetermined time by said local communication means via said communication network to said central site to be processed by said central control and processing means.

2. System according to claim 1, wherein at least one local site comprises local collection means comprising means for collecting data emitted by external means for detecting and capturing data passing through a second network.

3. Method for remote data collection in an environment comprising a plurality of local collection sites connected to a central site via a communication network, each local collection site comprising local collection means to collect data, local storage means to store said collected data, local communication means to transfer said data to said central site via said communication network, and control terminals connected to said communication network to communicate with remote control centers, said central site comprising central control and processing means and communication means connected to said communication network, said method comprising the steps of detecting a data stream exchanged between said control terminals and said remote control centers;

selectively capturing at least a portion of said data stream without interfering with a flow of said data stream;

storing said captured data in said local storage means;

transferring, under a control of said central site, said stored data to said central site at a predetermined time via said communication network;

processing said transferred data by said central control and processing means.

* * * * *